Figure 1:
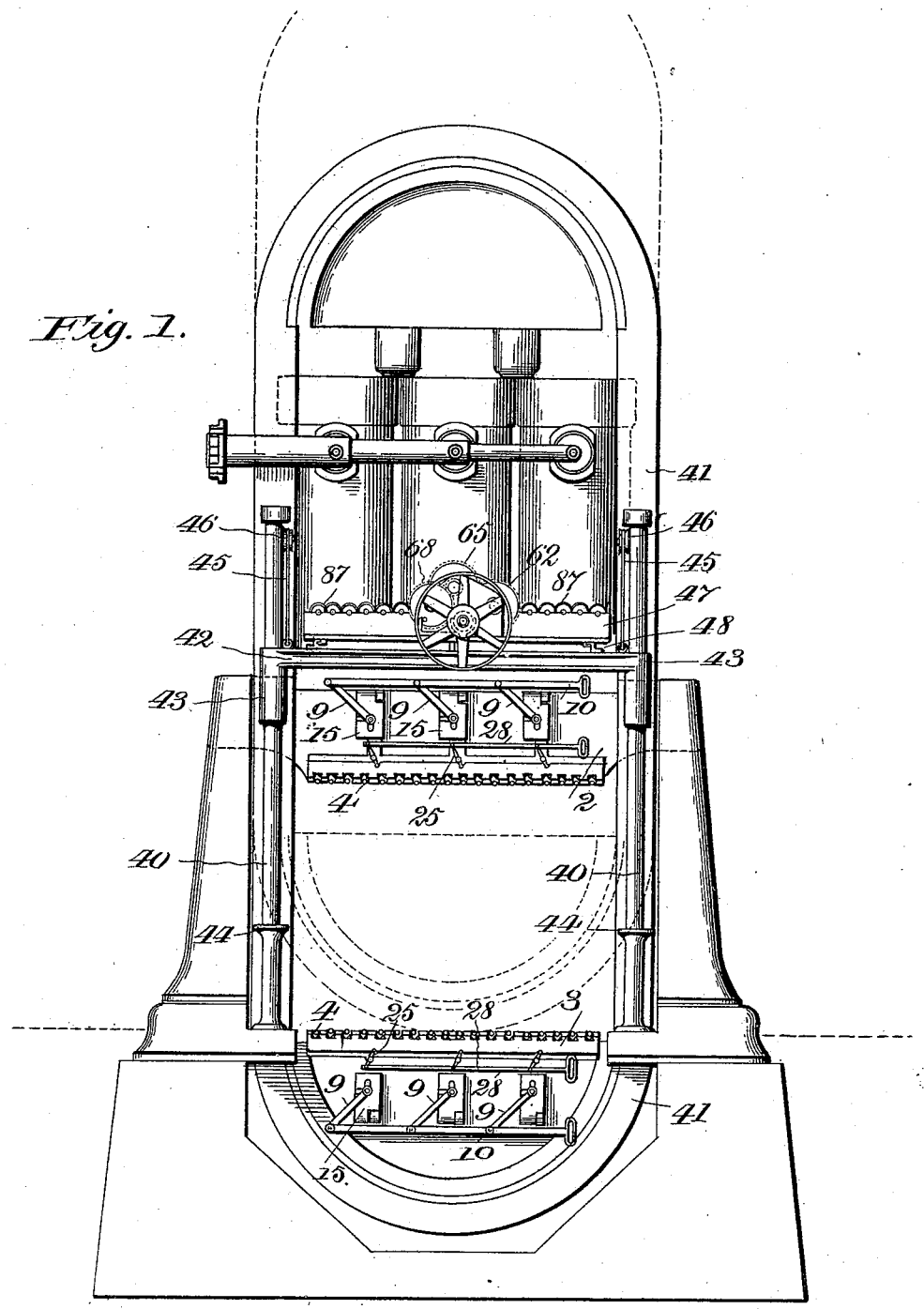

No. 618,645. Patented Jan. 31, 1899.
W. M. COONRADT.
APPARATUS FOR TYING COMPRESSED BALES WITH WIRE.
(Application filed May 17, 1898.)
(No Model.) 5 Sheets—Sheet 1.

Witnesses: Inventor:
L. C. Hills Wm. M. Coonradt,
Alfred T. Gage, By [signature]
Atty.

No. 618,645. Patented Jan. 31, 1899.
W. M. COONRADT.
APPARATUS FOR TYING COMPRESSED BALES WITH WIRE.
(Application filed May 17, 1898.)
(No Model.) 5 Sheets—Sheet 2.
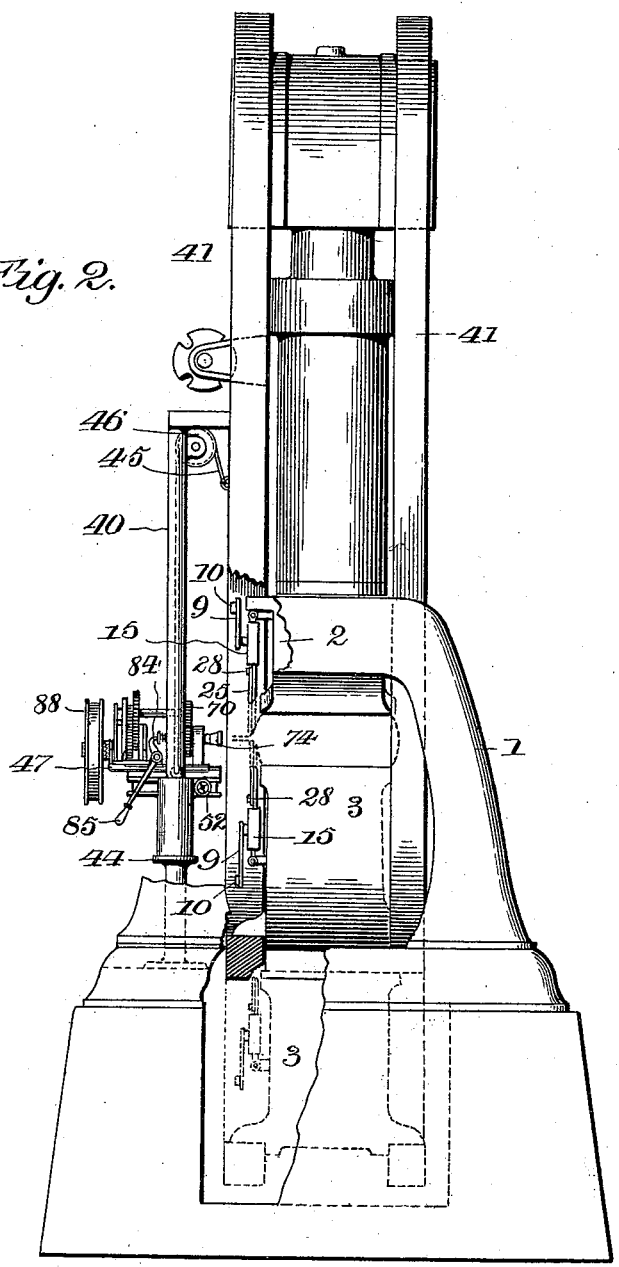

No. 618,645. Patented Jan. 31, 1899.
W. M. COONRADT.
APPARATUS FOR TYING COMPRESSED BALES WITH WIRE.
(Application filed May 17, 1898.)
(No Model.) 5 Sheets—Sheet 3.
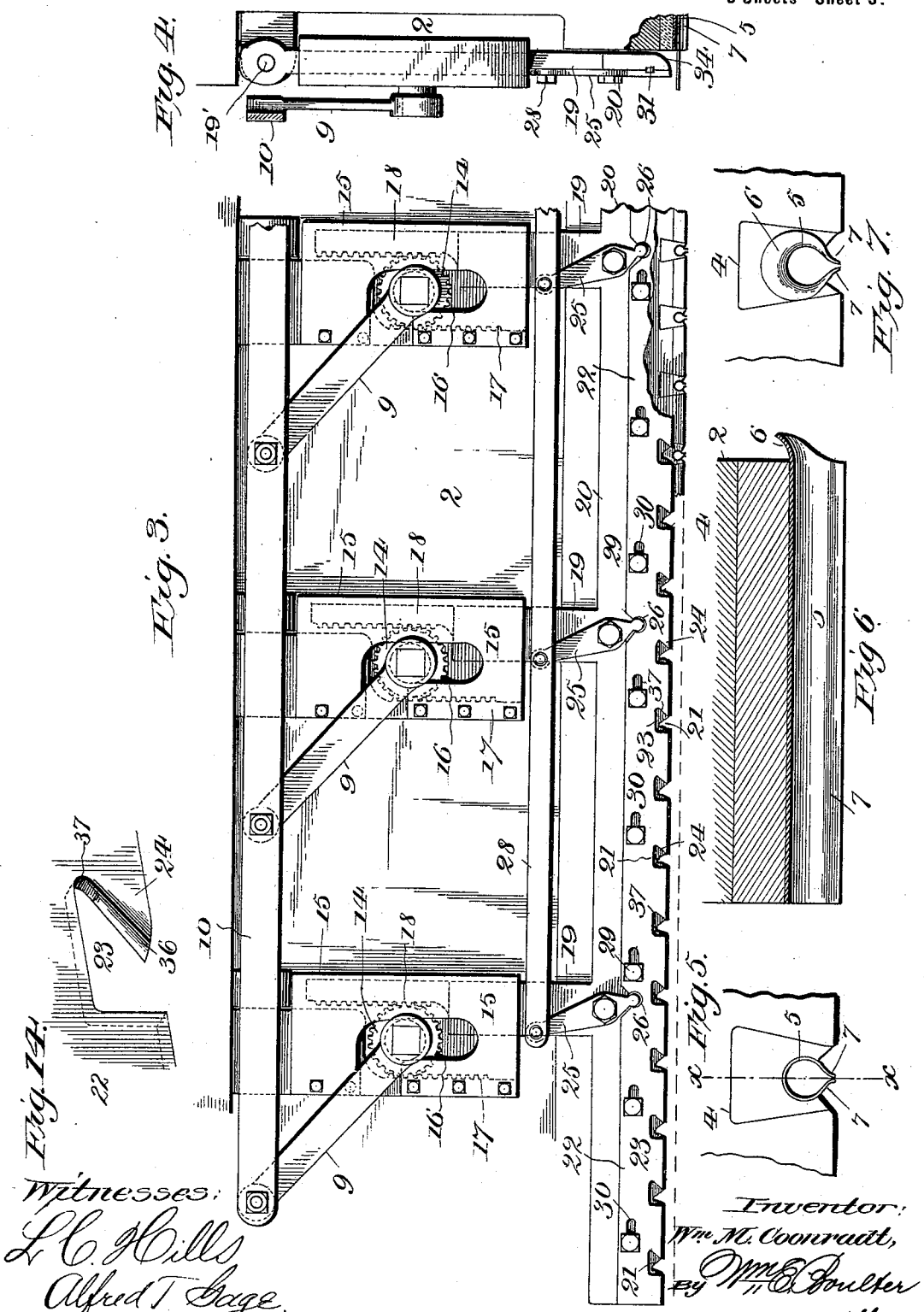
THE NORRIS PETERS CO., PHOTO-LITHO., WASHINGTON, D. C.

No. 618,645. Patented Jan. 31, 1899.
W. M. COONRADT.
APPARATUS FOR TYING COMPRESSED BALES WITH WIRE.
(Application filed May 17, 1898.)
(No Model.) 5 Sheets—Sheet 4.
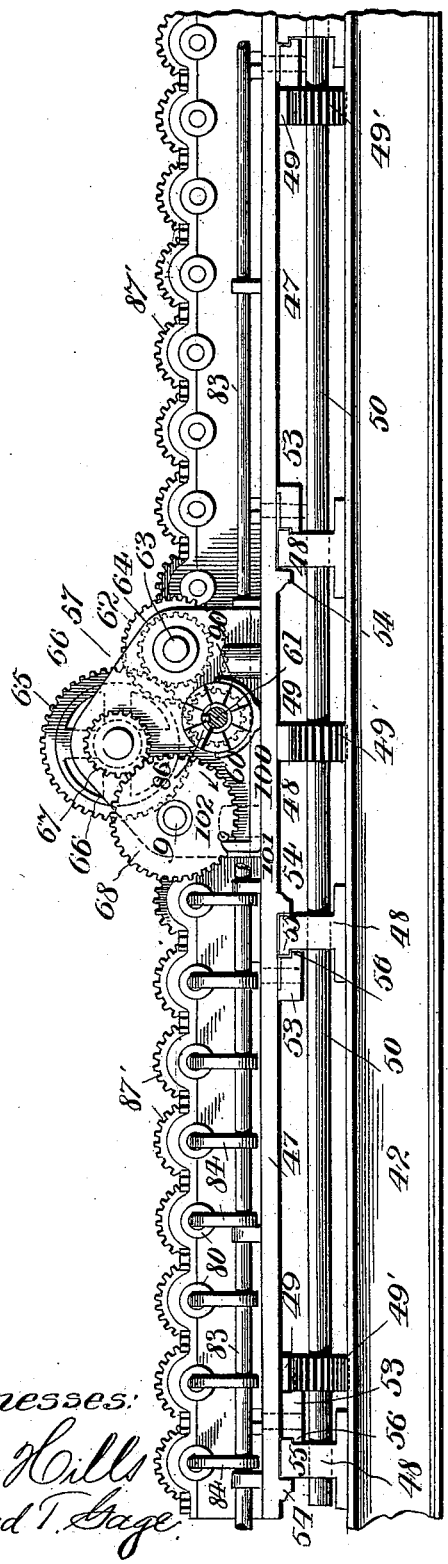
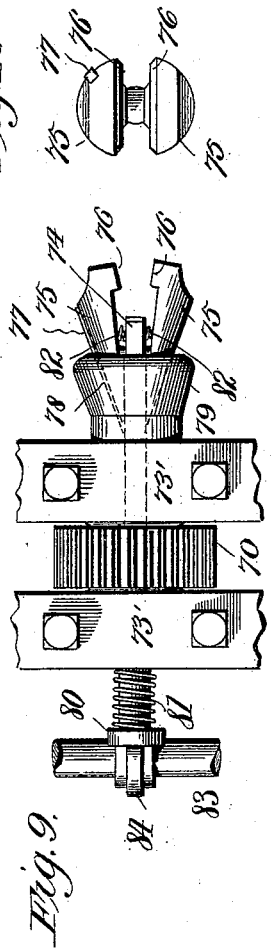

No. 618,645. Patented Jan. 31, 1899.
W. M. COONRADT.
APPARATUS FOR TYING COMPRESSED BALES WITH WIRE.
(Application filed May 17, 1898.)
(No Model.) 5 Sheets—Sheet 5.
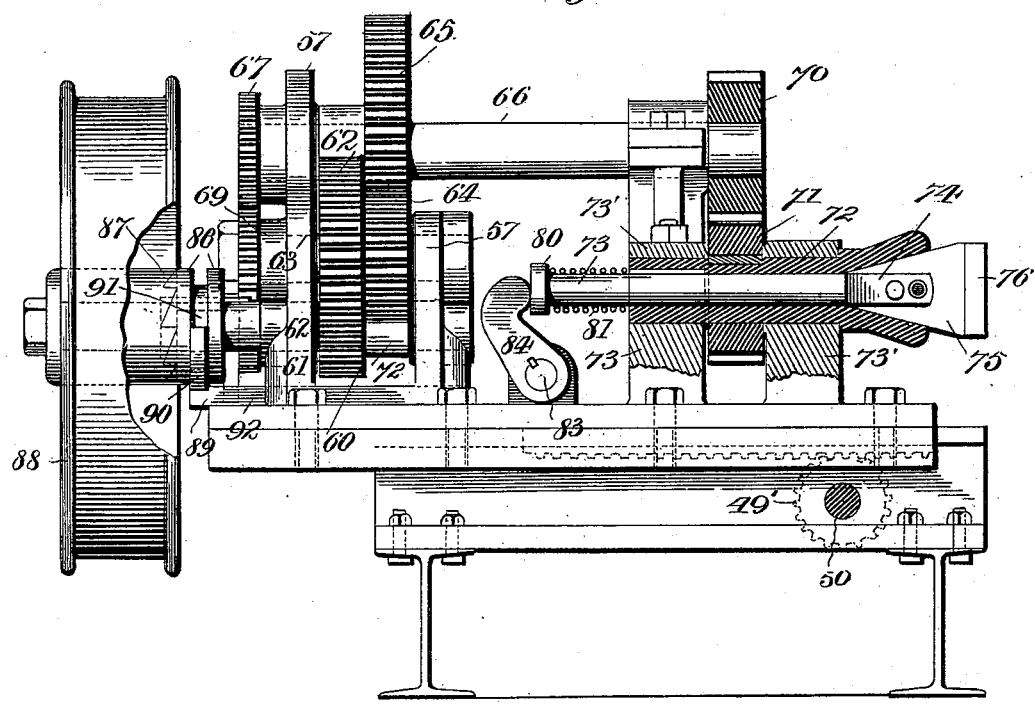
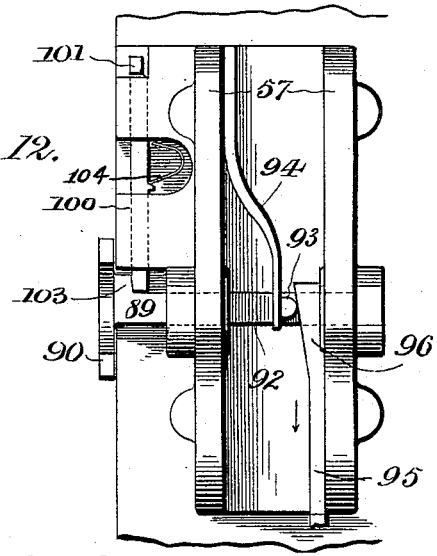 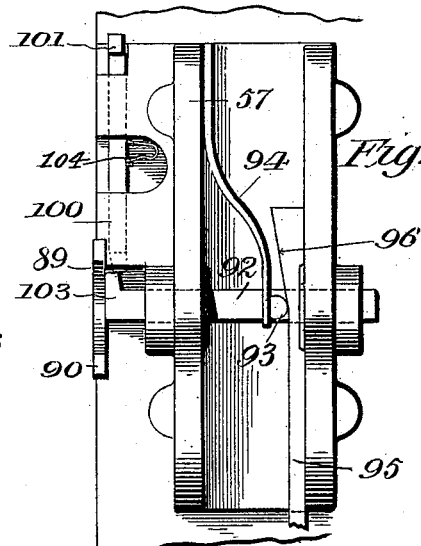
Witnesses:
L. C. Hills.
Alfred T. Gage.
Inventor:
Wm M. Coonradt,
By Wm E. Boulter
Atty.

UNITED STATES PATENT OFFICE.

WILLIAM M. COONRADT, OF ATLANTA, GEORGIA, ASSIGNOR TO ROBERT G. HITT, OF SAME PLACE.

APPARATUS FOR TYING COMPRESSED BALES WITH WIRE.

SPECIFICATION forming part of Letters Patent No. 618,645, dated January 31, 1899.

Application filed May 17, 1898. Serial No. 680,953. (No model.)

*To all whom it may concern:*

Be it known that I, WILLIAM M. COONRADT, a citizen of the United States, residing at Atlanta, in the county of Fulton and State of Georgia, have invented certain new and useful Improvements in Apparatus for Tying Compressed Bales with Wire; and I do declare the following to be a full, clear, and exact description of the invention, such as will enable others skilled in the art to which it appertains to make and use the same.

My invention has relation to devices or apparatus adapted to be used in conjunction with compressors for compressing merchandise, such as cotton, into bales, said devices being adapted to strain and twist the ties used for securing the compressed bales, whereby such ties will be effectually secured in a tightened condition around the bale and will reduce the expansion of the bale to a minimum after being freed from compression by the compressor; and my said invention also contemplates the use of tubes adapted to be arranged within the ordinary grooves of the platens, whereby the bale-ties may be guided or threaded therethrough without interfering with the bagging of the bale.

My invention consists in the novel construction, arrangement, and combination of parts, as hereinafter fully described, illustrated in the accompanying drawings, and pointed out in the appended claims.

In the drawings, Figure 1 is a front elevation of a compressor having my improvements combined therewith. Fig. 2 is an end elevation of the same, partly broken away. Fig. 3 is a front elevation, broken away, of the "collector" or bale-tie-gripping device. Fig. 4 is an end view thereof. Fig. 5 is a vertical sectional view of a portion of one of the platens, showing the bale-tie-containing tube arranged within one of the platen-grooves. Fig. 6 is a vertical longitudinal sectional view on line *x x* of Fig. 5. Fig. 7 is a rear end view of Fig. 6. Fig. 8 is a rear elevation of the tie-twisting device. Fig. 9 is an enlarged plan view showing a twister-head and spindle. Fig. 10 is an end view of a twister-head. Fig. 11 is an end elevation, partly in section, showing one of the twister-heads and spindles and means for applying power to and operating said head and spindle automatically. Fig. 12 is a sectional plan view of a portion of the automatic mechanism for operating the clutch for imparting power to the twisters, showing the parts in the position they assume when the clutch is in operation. Fig. 13 is a similar view with the parts in the position when the clutch is released—*i. e.*, when out of operation. Fig. 14 is a detail perspective view of a portion of one of the gripper-plates.

1 indicates a compressor for compressing cotton or other merchandise, and the same may be of any suitable or ordinary construction and operated by any desired power. For convenience I have shown the same as being operated by hydraulic power, though I am not to be restricted to a compressor so operated.

2 indicates the upper or stationary platen, and 3 the lower or movable platen. Each of these platens is provided in its working face with the usual tie-grooves 4, extending transversely thereof. The number of grooves may of course vary, according to the number of ties that it is desired to use.

For the purpose of enabling the ties to be readily threaded through from one side of the platen to the other without any liability of interfering with the bagging of the bale I use a metallic tube 5. (Shown more plainly in Figs. 5, 6, and 7.) These tubes are in practice of a length to extend the full length of the tie-grooves 4, within which latter they are to be arranged, and at one end each tube has a flaring portion or mouth 6 to enable the ends of the ties to be more readily inserted within the tube. Each tube is of a generally cylindrical shape and divided longitudinally its entire length to provide lips 7, which are curved outward slightly, as shown. The tubes are to be fixedly secured within the grooves by any suitable means and so that the outer edges or ends of the lips will occupy such position relatively to the working faces of the platens as not to bear at all upon the compressed bale confined between the said platens, it being essential, however, that the lips of the tube be left free to yield or spring apart, as will be necessary when the ties are to be strained around the bale, as presently described. The diameter of the tubes may of course be varied, though I contemplate using tubes of sufficient size to permit tie-wires of various sizes to be used in conjunction therewith. Any suitable metal might be used in the construction of the tubes, as spring-steel or the like.

I will now describe the means for straining and twisting the tie-wires around the compressed bale, so as to prevent expansion of the bale to any appreciable extent after being freed from the compressing action of the compressor.

9 indicates a series of arms which are coupled together and operated simultaneously by a horizontally-movable operating rod or lever 10. The lower or opposite ends of the arms 9 are fixedly mounted upon the bosses of pinions 14, which are arranged snugly within housings 15. The latter are each provided in one side with an L-shaped groove or slot 16. The left end of each housing is closed by a rack-plate 17, removably bolted in place, and this construction, as well as the provision of the slot 16, adapts the pinion to be readily inserted or removed from the housing whenever desired. The vertical portion or leg of the slot is adapted to receive the boss of the pinion and serve as a guide for the same in its vertical movements. At the opposite side of the housing is arranged a vertical rack 18, with which the pinion 14 meshes, as shown. Said rack 18 is adapted to be vertically reciprocated within the housing. It will thus be seen that when the lever 10 is drawn to the right, as viewed in Figs. 1 and 3, the pinion 14 will be revolved, and as the rack 17 is stationary the rack 18 will be forced downward. Each fixed rack-plate 17 is extended above the plane of the housings and adapted to bear against a fixed part of the frame, whereby a powerful expansive action of the arms 9, just described, may be obtained. The upper ends of the said extensions are pivotally mounted upon a horizontal rod 19', which is hung within suitable bearings on the press above the upper ends of the housings and serves as a pivot for the plates 17 and housings and parts carried thereby to enable the same to swing toward and away from the bale, as presently described. The racks 18 are secured to or made integral with upwardly-extending arms 19 of a horizontally-arranged plate 20, which is provided along its lower edge with notches 21, corresponding in number and relative position to the tubes.

Carried by the plate 20, but adapted to have a longitudinal horizontally-reciprocating movement parallel with the plate 20, is a plate 22, provided along its lower edge with notches 23, so positioned as to coöperate with the notches 21 to grip the ties between them, as presently more clearly set forth. The notches 23 are shaped to provide projecting lips or hooks 24, whose purpose is to engage beneath or collect the wires to insure the same being properly forced within and between the grooves of the two plates and also to tightly clamp or grip said wires.

In order to move the plate 22 longitudinally when it is desired to collect and grip the wires, as just described, I provide rock-arms 25, pivoted intermediate their ends to the plate 20, one end of said arms being rounded to form a ball-and-socket joint with the plate 23, which latter has notches or recesses 26 formed therein along its upper edge for that purpose. The opposite end of the arms 25 are pivotally connected with an operating-lever 28, adapted to be operated by hand or otherwise. By moving the lever 28 to the right, as viewed in Fig. 3, the plate 22 will be moved to the left to thereby collect and grip the wires tightly. 29 indicates studs on the plate 20, projecting through slots 30 in the plate 22, while the plate 22 is further guided and maintained in proper relative position to the other plate by any suitable guide—as, for instance, a spline 31 within opposing grooves in the two plates.

As heretofore described, when the lever 10 is moved to the right the downward movement of the racks 18 is effected, and this carries downward the plates 20 22 until the ends of the wires projecting beyond the face of the bale are centered within the notches 21 23, after which the lever 28 is moved to the right to effect the clamping of the said ends and hold them until acted upon by the twisting devices presently described.

It will be observed that the entire collecting or gripping device, as hereinabove described, is adapted to swing or oscillate upon the rod 19' toward and away from the compressed bale, so that when the plates are moved downward to collect the wire the said plates will by following the rounded or bulging side of the compressed bale swing outward to follow somewhat the contour of said rounded side of the bale, the lower end of the plate 20 being rounded or curved, as at 34, to prevent any liability of the said plates catching within the bale, which would thereby prevent the outward oscillation of the plates and the further downward movement of the plates for properly collecting the wires.

I would state that I provide the lower platen with a collecting and gripping device a duplicate of that employed in conjunction with the upper platen, as seen clearly in Fig. 1, and therefore it will not be necessary to describe the same in detail.

After the wires have been collected and gripped tightly by the upper and lower grippers both the latter are simultaneously moved toward each other until they reach such position relatively to the center of the twisters, presently described, as will enable the latter to catch and twist the ends of the wires held by the grippers, and this movement of the grippers exerts a strain or tension upon the wires which will take up all slack therein and cause said wires to bind tightly around the bale. Thus the slack in the bands usually found when compressing bales in the usual manner, and which is allowed to remain owing to the lack of proper means for taking it up, thereby permitting the bale to expand to a considerable extent when released from the compressing action, is in my invention entirely taken up and no room allowed for the bale to expand to any appreciable extent when the bale is released. As shown in Fig. 14, the hook portions 24 are tapered and rounded at the point, as at 36, to adapt said points to readily engage under the wire ends, of irregular shape or presentation, and said hook portions from an intermediate point in their length to the apex at 37 is a plane surface, whereby such plane surface, in conjunction with the plane or rectilinear surface of the notches 21, will act to always present the wire ends to the twisters parallel to each other and in axial line of the twisters.

I will now describe the means which I employ for twisting together the ends of the wire ties while they are held by the grippers, as just above described, together with the means whereby said twisters are supported and operated. At the delivery side of the compressor, near opposite ends, I provide standards 40, rising to a point somewhat above the upper platen. These standards are secured at the lower ends to the floor and at the upper ends to a stationary part of the press.

42 indicates a cross-head which is provided at opposite ends with collars 43, slidingly mounted upon the standards, which serve as guides for the cross-head. This cross-head is adapted to support the twisters, and as said cross-head is adapted for vertical adjustment said twisters will be similarly adjusted simultaneously therewith. Stops or abutments 44 are provided integral with the columns 40 and serve to limit the downward movement of the cross-head and afford a support for the latter when the twisters are in operation. The said cross-head and parts supported thereby are suspended by means of ropes, cables, or chains 45, which are secured at one end to the cross-head, thence pass upwardly and over pulleys 46, and thence downwardly and are secured at the opposite ends to the front link 41 of the press-frame. Mounted upon the cross-head and adapted to have a horizontal reciprocating movement thereon in a direction toward and away from the compressor is a carriage 47, slidingly supported upon tracks 48, secured upon the cross-head. The carriage 47 is provided upon its under side with racks 49, with which mesh pinions 49', mounted upon a shaft 50, extending parallel with the delivery side of the press and mounted in bearings on the cross-head. Said shaft 50 is adapted to be rotated by any suitable means—as, for instance, by a hand-wheel 52 thereon. The carriage is guided in its reciprocating movements by means of blocks or pieces 53, bolted to the carriage, and ribs 54, which form guideways to receive between them the tracks, as shown. The carriage may be held to a horizontal position by providing an overhanging edge 55 on the tracks, beneath which engages a lip 56 on the pieces 53. Mounted upon the carriage is a frame, within the standards or bearings 57 of which are mounted a train of multiplying gear-wheels for communicating motion to the twisters and which comprises a gear-wheel 60, mounted on a power-transmitting shaft 61, supported by the carriage, a gear-wheel 62 on a shaft 63, with which latter gear the gear-wheel 60 meshes, and a gear-wheel 64 on shaft 63, gearing with a gear-wheel 65 on a shaft 66, which latter also carries a gear-wheel 67, meshing with a gear-wheel 68 on a stud 69. A gear-wheel 70 is mounted on the shaft 66, said gear-wheel meshing with a gear-wheel 71 on the twister-spindle 72, within which is arranged a plunger 73. I provide a series of twister-spindles 72, corresponding in number with the sets of the grippers. These spindles are revolubly mounted in bearings 73', carried by the carriage. Each of the plungers has a forwardly-projecting rectangular extension 74, with which is pivotally connected jaws 75, which serve to grip and twist the wire ends presented thereto by the grippers heretofore described, and each of the jaws 75 is provided with oppositely-located gripping-surfaces 76, between which the wire ends are clamped. The jaws 75 are adapted to be turned with the spindle and for this purpose are provided with splines 77, adapted to engage in recesses 78 in the flared mouth 79 on the spindle. The rear end of each plunger has a collar 80, and between the same and the rear end of the twister-spindle is arranged a coiled spring 81, the tendency of which is to force the plunger and with it the jaws rearwardly, thus causing the forward clamping ends of the jaws to close together upon the wire ends presented between them by the grippers. When the plungers are forced in the opposite direction—that is to say, toward the press—by the means presently described, the jaws will be permitted to be spread apart to release the said wire ends, and for spreading the jaws apart when so released I employ springs 82, arranged between the inner opposing faces of the jaws and the extensions of the plungers.

In order to provide for the simultaneous twisting operation of the twisters, I mount gear-wheels 87' upon the twister-spindles, in gear with each other, so that when motion is communicated to the gear-wheel 71 from the gear-wheel 70, as before described, all the twister-spindles will be simultaneously operated to effect the simultaneous twisting of all the wire ends.

For forcing the plungers and the jaws forwardly toward the press to catch and twist the wire ends together I employ a shaft 83, mounted in bearings on the carriage and in a direction at right angles to the longitudinal axis of the spindles. Upon the shaft are mounted a series of arms or levers 84, one for each plunger, the upper free end of each arm being adapted to bear against the rear end of the plunger and to force the latter forward when the shaft is turned to the right. The said shaft may be operated by any suitable means—as, for instance, a hand-lever 85, mounted thereon.

For imparting rotation to the shaft 61 and through the multiplying-gearing to the twister-spindles I employ a clutch device, comprising a clutch-section 86, splined to the shaft 61, and a clutch-face 87, formed on the hub of the belt-pulley 88, with which clutch-face the section 86 is adapted to engage when moved to the left along the shaft 61, and for so shifting the clutch-section I employ a shifting-lever 89, having a fork-shaped end 90 extending vertically up within a groove 91 in the clutch-section. The lever 89 has a horizontal portion 92 slidingly supported upon the carriage. Upon the lever is a stud 93, against which bears one end of a leaf-spring 94, whose opposite end is secured to the standard 57, the tendency of said spring being to normally force the shifting-lever 89 to the right, as viewed in Fig. 11, to draw the clutch-section out of engagement with the clutch-face on the pulley.

Slidingly mounted upon the multiplying-gear-supporting frame is a lever 95, which at one end is made in the wedge shape, seen more plainly in Figs. 12 and 13, the inclined face 96 of which is adapted to ride against the stud 93 when the lever is drawn in the direction of the arrow in Figs. 11 and 12, and when drawn in said direction the clutch-shifting lever is forced to the left, as viewed in Fig. 11, to effect the engagement of the clutch-section with the clutch-face of the pulley to thereby set the twisters in operation.

In order to provide for the automatic stoppage of the twisters when the wire ends have been twisted together, I provide the following means: 100 indicates a lever slidingly supported upon the carriage, having a bent-up end 101, which is adapted to be struck by a stud 102 on the gear-wheel 68. The opposite end of the lever 100 is adapted to engage behind an offset or shoulder 103 on the clutch-shifting lever when the clutches are in engagement and the twisters are operating; but when the gear-wheel 68 has reached a point in its rotation to bring the stud 102 against the end 101 of lever 100, which will be at the moment when the twisters have completed the twisting of the wire ends, (the parts being so timed that the twisting is completely effected during one revolution of the gear-wheel 68,) then the lever 100 will be drawn out of engagement with the offset 103, and thus permit the spring 94 to throw the clutch-shifting lever to the left in Fig. 11 and stop the further rotation of the twisters.

104 indicates a spring arranged to act upon the lever 100 to throw the same into the position shown in Fig. 12 when the stud 102 has cleared the bent end 101 of said lever.

The operation of my improved gripping, tightening, and twisting devices may be briefly described as follows: The cotton or other merchandise to be compressed having been introduced between the platens, the compressor is operated to cause the lower platen to rise and compress the cotton into the form of a bale of the required density. In this upward movement of the lower platen the cross-head and with it the twisters are lowered from the position seen in Fig. 1 to the position seen in Fig. 2, with said twisters occupying a horizontal plane intermediate the platens. The position of the twisters relatively to the horizontal median line of the compressed bale will necessarily vary owing to the different thicknesses to which different bales may be compressed; but with bales compressed to the usual thicknesses the said twisters will always be in a position to properly operate upon the wire ends. After the bale has been sufficiently compressed the wire ties, having a U shape, are passed through the tubes from the receiving side of the press, one portion or leg of the U being threaded through a tube in the upper platen and the other leg through the corresponding tube in the lower platen vertically beneath. After the threading in of the necessary number of ties the levers 10 of the upper and lower grippers are drawn to the right, as viewed in Figs. 1 and 3, thereby lowering the upper gripper and raising the lower gripper until the wire ends enter within the notches of the gripper-plates. The levers 28 are then drawn to the right, thereby causing the plate 22 to move to the left and tightly grip the wires. The shaft 83 is now rotated to cause the levers 84 to open the jaws 75, as indicated in Figs. 9 and 10, and the carriage run up to a point adjacent to the side of the bale, but not sufficiently near to prevent the passage of the gripper-plates between the forward ends of the jaws and the bale. The grippers are now simultaneously moved toward each other, thereby putting the wire ties under tension and taking up all slack therein, and in this movement of the grippers the wire ends pass between the jaws of the twisters, and the levers 84 are then thrown to the left to cause the jaws to close upon the wire ends. The levers 28 are now moved to the left to permit the plates 22 to release the wire ends, and the twisters are now set in operation by coupling the clutch-section to the clutch-face of the driving-pulley by drawing the lever 95 in the direction of the arrow, Fig. 12, and when the coupling is effected said lever is moved in the reverse direction into the position indicated in Fig. 13. The twisters will now twist the wire ends together close up to the side of the bale, and as soon as a sufficient number of turns have been given (usually two turns are sufficient) the operation of the twisters is automatically stopped by the stud 102 on gear-wheel 68 operating upon the lever 100 to free the shoulder 103 and permitting the spring 94 to throw the clutches out of engagement. The levers 84 are now operated to force the plungers forward to allow the springs 82 to open the jaws and release the wire ends, the carriage is run back to the left away from the press, the jaws 75 are closed together, and the carriage again run forward to cause the closed jaws to force the twisted ends of the wires up against the side of the bale. The carriage is again run back to the left, the grippers are moved back to their normal positions, (seen in Fig. 1,) and the lower platen moved down to release the bale, thereby drawing up the cross-head and twisters supported thereby out of the way, and the tied bale removed from the compressor. The parts are now ready to operate upon another bale.

What I claim, and desire to secure by Letters Patent, is—

1. The combination with the platen of a compressor, of tubes arranged within grooves in the platen and adapted to receive the bale-ties said tubes being slotted or divided as described to provide spring lips or edges, as and for the purpose set forth.

2. The combination with the platen of a compressor, of tubes arranged within grooves in the platen and adapted to receive the bale-ties, said tubes being slotted or divided as described to provide spring lips or edges, and being provided at one end with a flaring mouth, as and for the purpose set forth.

3. The combination with the upper and lower platens of a compressor, of tubes arranged within grooves in the platens and adapted to receive the bale-ties, said tubes being slotted or divided as described to provide spring lips or edges.

4. The combination with a platen of a compressor, provided with tie-grooves, of tubes arranged therein, said tubes being slotted or divided to provide spring lips or edges as described and means for securing the tubes in position within the grooves.

5. In an apparatus of the character described, the combination with a compressor, a gripping device adapted to grip and hold one end of a wire, a gripping device adapted to grip and hold the other end of the wire and means for moving the gripping devices toward each other to tighten the wire around the bale and bring the wire ends in proximity to each other, of means for twisting the proximate wire ends together.

6. The combination with a compressor, of means for gripping and tightening bale-ties around a bale, comprising two plates arranged in proximity to a face of the compressor and operating independently of the latter to effect the gripping and tightening of the ties, one of said plates being adapted to be moved relatively to the other, and said plates being provided with notches adapted to receive the ends of the ties, the gripping-face of the notches in one plate being horizontal and the notches in the other plate being shaped to provide hooks as described, said hooks from the end to an intermediate point being rounded and the gripping-faces of said notches from said intermediate point to the opposite end being inclined for the purpose set forth, and means for operating the movable plate to effect the gripping of the ends of the ties within the notches.

7. The combination with a compressor, of means for gripping and tightening the bale-ties around the bale, comprising two plates, one of which is adapted to be moved relatively to the other plate, and said plates being provided along one edge with notches adapted to receive the ends of the ties, means for operating the movable plate to effect the gripping of the ties within the notches, and means for simultaneously moving the plates vertically after gripping the ties to tighten the latter around the bale.

8. The combination with a compressor, of means for gripping and tightening the bale-ties around the bale comprising two plates, one of which is adapted to be moved relatively to the other plate, and the plates being provided along one edge with notches, adapted to receive the ends of the ties, one of said plates being pivotally supported at one end to adapt the plates to swing or oscillate outwardly from the compressor whereby to clear the bulging side of the bale, means for operating the movable plate to effect the gripping of the ties, and means for simultaneously moving both plates after gripping the ties to effect the tightening of the latter around the bale.

9. The combination with a compressor, of a gripper arranged to grip the projecting ends of the ties, comprising two plates one of which is adapted to be moved relatively to the other and both being provided with notches to receive the ends of the ties, one of the plates being pivotally supported at one end to adapt the plates to swing outwardly from the compressor to clear the bulging side of a bale, and means for operating the movable plate to effect the gripping of the ends of the ties.

10. The combination with a compressor, of oppositely-arranged grippers each adapted to grip the projecting ends of the ties, and each comprising two plates provided with notches to receive the ends of the ties, one of said plates being movable relatively to the other, means for operating the movable plate to effect the gripping of the ties, and means for moving said grippers toward each other after having gripped the ties for the purpose of tightening the latter around the bale.

11. The combination with a compressor, of oppositely-arranged grippers each adapted to grip the projecting ends of the bale-ties and each comprising two plates provided along one edge with notches to receive the ends of the ties, one of said plates being movable relatively to the other, means for operating the movable plates to effect the gripping of the ties, one of the grippers being carried by the movable platen and adapted to move simultaneously therewith and the other gripper being supported by a stationary part of the compressor, and means for moving the grippers toward each other after having gripped the bale-ties for the purpose of tightening the latter around the bale.

12. The combination with a compressor, of a gripper for gripping and tightening the bale-ties around a bale comprising two plates, one of which is adapted to be moved relatively to the other, and both being provided with notches means pivotally connecting one of the plates with the compressor to adapt its opposite end to swing outwardly from the compressor, and said opposite end being rounded as set forth.

13. The combination with a compressor, of a gripper for gripping and tightening the bale-ties around the bale, comprising two plates provided along one edge with tie-receiving notches, one of said plates being adapted for longitudinal movement relatively to the other plate, arms or levers pivotally connected intermediate their ends with one plate and at one end with the movable plate, and an operating-lever pivotally connecting the opposite ends of the levers together to adapt them for simultaneous movement, as and for the purpose specified.

14. The combination with a compressor, of a gripper for gripping and tightening the bale-ties around a bale, comprising two plates provided at intervals along one edge with tie-receiving notches, one of said plates being adapted for longitudinal movement relatively to the other plate, means for operating the movable plate, vertical racked extensions on said plate, housings within which said extensions extend and are adapted for vertical movement, fixed racks within said housings and extending beyond the latter so as to be adapted to have a bearing against a fixed part of the compressor, pinions arranged between and meshing with the fixed and movable racks, arms rigidly connected at one end with said pinions, and an operating-lever pivotally connected with the opposite ends of said arms.

15. The combination with a compressor, of a gripper for gripping and tightening the bale-ties around a bale consisting of two plates provided with tie-receiving notches, one of said plates being adapted for longitudinal movement relatively to the other plate, racked extensions on said plate, housings within which said extensions extend and are adapted for vertical movement, each housing having an L-shaped slot in one side, fixed racks arranged in the housings and removably closing one end thereof and adapted to have a bearing at one end against a fixed part of the compressor, pinions arranged between and meshing with the fixed and movable racks, arms rigidly connected at one end with said pinions, and an operating-lever pivotally connected with the opposite ends of said arms.

16. The combination with a compressor, and gripping devices adapted to grip the opposite ends of the ties and bring them into proximate relation as described, of a series of rotatable hollow spindles having flared ends, a rod longitudinally movable within each spindle and rotatable therewith and having a squared extension projecting within the flared end of the spindle, a pair of clamping and twisting jaws pivotally connected with each of said extensions and the various pairs of jaws being adapted to operate upon the ends of the ties held by the gripping devices, means for moving the twisting devices toward the compressor, and means for rotating the spindles and jaws after the latter have clamped the ends of the ties.

17. The combination with a compressor and gripping devices adapted to grip the opposite ends of the ties and bring them into proximate relation, of twisting devices comprising a series of rotatable hollow spindles having flared ends, a rod longitudinally movable within each spindle and rotatable therewith and having a squared extension projecting within the flared end of the spindle, a pair of clamping and twisting jaws pivotally connected with each of said extensions, means for moving the twisting device toward the compressor, means for rotating the spindles and jaws after the latter have clamped the ends of the ties, and springs operating to spread the jaws apart when the rods are moved to free the jaws in the manner described.

18. The combination with a compressor and gripping devices adapted to grip the opposite ends of the ties and bring them into proximate relation, of twisting devices comprising rotatable hollow spindles having flared ends, a rod longitudinally movable within and rotatable with each spindle, and having a squared extension extending within the flared end of the spindle, a pair of clamping and twisting jaws pivotally connected with each extension, said jaws having inwardly-turned ends to provide opposite clamping-faces, means for moving the twisting device toward the compressor, and means for rotating the spindles and jaws after the latter have clamped the ends of the ties.

19. The combination with a compressor, of twisting devices comprising rotatable hollow spindles, a rod longitudinally movable within and rotatable with each spindle, a pair of clamping and twisting jaws pivotally connected with each rod, a rock-shaft, and arms carried by said shaft adapted to bear upon and simultaneously move the rods toward the compressor, and means for rotating the spindles and jaws for the purpose set forth.

20. The combination with a compressor, of a carriage adapted for horizontal movement toward and from the compressor, and a series of twisting devices carried by the carriage and movable horizontally therewith, said twisting devices comprising a series of rotatable hollow spindles, a rod longitudinally movable within each spindle and rotatable therewith, a pair of clamping and twisting jaws pivotally connected with each rod, and means for rotating the spindles and jaws.

21. The combination with a compressor, and a vertically-movable platen thereof, of a carriage adapted for horizontal movement toward and from the compressor, means for suspending the carriage from the movable platen to adapt said carriage to have a vertical movement simultaneously with the movement of the platen, and a series of twisting devices carried by and partaking of the movements of the carriage.

22. The combination with a compressor and the movable platen and link thereof, of a cross-head suspended from the said link as described, a carriage carried by and adapted to have a horizontal reciprocating movement upon said cross-head toward and from the compressor, and a series of twisting devices carried by and partaking of the horizontal and vertical movements of the carriage, all as and for the purpose specified.

23. The combination with a compressor, vertical standards thereon and the movable platen and link, of a cross-head vertically movable upon and guided by said standards, a carriage carried by and movable horizontally upon the cross-head toward and from the compressor, and twisting devices carried by and partaking of the horizontal and vertical movements of the carriage, pulleys on the standards, and supporting ropes or cables attached to the cross-head, passing over the pulleys and secured at the opposite ends of the movable link.

24. The combination with a compressor, of a series of twisting devices comprising rotatable hollow spindles, a rod movable longitudinally within each spindle and rotatable therewith, a pair of clamping and twisting jaws pivotally connected with each rod, means for moving the rods and jaws toward the compressor, a power-transmitting shaft, gearing for transmitting simultaneous rotation to the spindles from said shaft, and means for effecting the automatic disengagement of the said gearing from said shaft, for the purpose specified.

25. The combination with a series of rotatable twisters having clamping-jaws adapted to clamp and twist together the ends of wire ties, a power-transmitting shaft, a belt-pulley mounted thereon and having a clutch-face, and gearing for transmitting simultaneous rotation to said twisters from said shaft, of means for effecting the automatic disengagement of the said gearing from said shaft, comprising a clutch-section splined to said shaft, a clutch-shifting lever, a sliding lever adapted to operate the clutch-shifting lever to effect the engagement of the clutch-section with the said clutch-face, a second sliding lever adapted to temporarily engage the clutch-shifting lever to hold the clutch-section in engagement with said clutch-face, a stud or pin on one of the gear-wheels adapted to engage with the said second sliding lever at each rotation of said gear-wheel to free it from the clutch-shifting lever, and a spring for freeing the clutch-section from the clutch-face of the pulley in the manner specified.

26. The combination with a series of rotatable twisters having clamping-jaws adapted to clamp and twist together the ends of wire ties, a power-transmitting shaft, a belt-pulley mounted thereon and having a clutch-face, and gearing for transmitting simultaneous rotation to said twisters from said shaft, of means for effecting the automatic disengagement of the said gearing from said shaft, comprising a clutch-section slidably mounted upon the said shaft, a clutch-shifting lever having a shoulder and a stud as described, a sliding lever having a wedge-shaped end adapted to operate upon said stud, a second sliding lever adapted to engage behind said shoulder to temporarily hold the clutch-section in engagement with the clutch-face of the pulley, a stud on one of the gear-wheels adapted to operate the said second sliding lever at each rotation of said gear-wheel, and a spring operating to free the clutch-section from the clutch-face in the manner and for the purpose specified.

In witness whereof I have hereunto set my hand in presence of the subscribing witnesses.

WILLIAM M. COONRADT.

Witnesses:
A. E. BOULTER,
WM. E. BOULTER.